(12) United States Patent
Rambusch

(10) Patent No.: US 11,225,592 B2
(45) Date of Patent: Jan. 18, 2022

(54) METHOD OF MAKING ADHESIVE WRAPPING TAPE FOR BUNDLING CABLES IN CARS

(71) Applicant: certoplast Technische Klebebaender GmbH, Wuppertal (DE)

(72) Inventor: Peter Rambusch, Wuppertal (DE)

(73) Assignee: CERTOPLAST TECHNISCHE KLEBEBAENDER GMBH, Wuppertal (DE)

( * ) Notice: Subject to any disclaimer, the term of this patent is extended or adjusted under 35 U.S.C. 154(b) by 328 days.

(21) Appl. No.: 15/960,138

(22) Filed: Apr. 23, 2018

(65) Prior Publication Data

US 2018/0265745 A1 Sep. 20, 2018

Related U.S. Application Data

(62) Division of application No. 14/426,289, filed on Mar. 10, 2015, now abandoned.

(51) Int. Cl.

| | |
|---|---|
| C09J 7/30 | (2018.01) |
| B05D 3/02 | (2006.01) |
| C09J 133/08 | (2006.01) |
| C09J 7/21 | (2018.01) |
| B05D 3/12 | (2006.01) |
| C09J 121/00 | (2006.01) |
| H01B 7/28 | (2006.01) |
| H01B 3/48 | (2006.01) |
| B60R 16/02 | (2006.01) |

(52) U.S. Cl.
CPC .............. *C09J 7/30* (2018.01); *B05D 3/0218* (2013.01); *B05D 3/12* (2013.01); *B60R 16/0215* (2013.01); *C09J 7/21* (2018.01); *C09J 133/08* (2013.01); *H01B 3/48* (2013.01); *H01B 7/2806* (2013.01); *H01B 7/2813* (2013.01); *C09J 121/00* (2013.01); *C09J 2203/302* (2013.01); *C09J 2301/124* (2020.08); *C09J 2400/263* (2013.01); *C09J 2421/00* (2013.01); *C09J 2423/046* (2013.01); *C09J 2423/106* (2013.01); *C09J 2433/00* (2013.01); *C09J 2467/006* (2013.01); *Y10T 442/2049* (2015.04); *Y10T 442/2738* (2015.04)

(58) Field of Classification Search
CPC ......... B05D 3/0218; B05D 3/12; C09J 121/00
See application file for complete search history.

(56) References Cited

U.S. PATENT DOCUMENTS

| | | | | |
|---|---|---|---|---|
| 6,790,505 B1* | 9/2004 | Goux | ..................... | D04H 3/04 |
| | | | | 428/114 |
| 2004/0253889 A1* | 12/2004 | Mundt | ..................... | C09J 7/21 |
| | | | | 442/149 |
| 2005/0227559 A1* | 10/2005 | Ternon | ..................... | C09J 7/21 |
| | | | | 442/149 |
| 2012/0279637 A1* | 11/2012 | Siebert | ..................... | C09J 7/21 |
| | | | | 156/185 |

* cited by examiner

*Primary Examiner* — Kelly M Gambetta
(74) *Attorney, Agent, or Firm* — Andrew Wilford

(57) ABSTRACT

An adhesive tape is made by hot calendering a substrate between two generally identical rolls one of which is heated to a different temperature than the other roll while rotating the rolls at the same peripheral speed to flatten one face of the substrate and reduce air permeability of the substrate by at least 15%. Then an adhesive coating is applied to at least one of the faces of the substrate.

12 Claims, No Drawings

METHOD OF MAKING ADHESIVE WRAPPING TAPE FOR BUNDLING CABLES IN CARS

CROSS REFERENCE TO RELATED APPLICATIONS

This is a divisional application of U.S. patent application Ser. No. 14/426,289 filed 10 Mar. 2015 as the US-national phase of PCT application PCT/EP2013/068348 itself filed 5 Sep. 2013 with a claim to the priorities of German patent applications 20 2012 103 442.5 filed 10 Sep. 2012 and 20 2012 103 754.8 filed 1 Oct. 2012.

FIELD OF THE INVENTION

The invention relates to an adhesive tape, more particularly a wrapping tape for the bundling cables in cars, comprising a tape-like rolled substrate, having a coating of adhesive applied to one or both faces of the substrate.

BACKGROUND OF THE INVENTION

An adhesive tape having the structure described above is described in DE 603 04 186 [US 2005/0227559]. This is essentially intended for working with a warp-knitted substrate comprising a weft yarn that has a higher titer than the knitting yarn. An adhesive coating is applied to the substrate. The substrate as a whole is of closed design to substantially prevent the adhesive from passing through it. For this purpose, the substrate is fed by rolls, among other means, of which at least one is heated. In this way, at least one face of the substrate is flattened, and optionally supports the melting or fusion of the substrate. As a result, a relatively flat, closed surface is formed on one face of the substrate.

The known adhesive tape has generally established itself as successful, but it is capable of improvement with regard to mechanical stability. Because such warp-knit substrates with a weft yarn, which has a higher titer than knitting yarn are not well suited to the extreme loads to which they are subjected when used for bundling cables in cars. It is true that the weft yarns in such warp-knitted substrates are the to run essentially parallel to each other along the length of the tape to cause the tape to tear. But this does not alter the fact that the mechanical stability required for the previously described use in cars is lacking.

A particularly suitable adhesive tape for automotive applications is presented in EP 1 448 744 [US 2004/0253889]. In this case, a substrate is created in the form of a woven or non-woven fabric having at least some areas on one or both faces with a surface that has been smoothed by grinding. Calender rolls are used for this, and are operated at different speeds to create friction with the surface that is to be ground smooth. In this way, a high gloss or chintz effect is created here, together with a practically closed, and consequently dirt-repellent surface. The surface formed thereby is more or less impermeable to various media such as oil, diesel, petrol etc., and resistant to dirt. As a result, the adhesive can be applied to the substrate easily and without penetrating or passing through it.

The process of grinding smooth described in EP 1 448 744 B1 requires that the rolls run at different circumferential speeds. In fact, a heated hard steel roll is most often used against a soft mating roll. The expense associated with technical equipment of this kind is not altogether inconsiderable. This is the situation on which the invention is based.

OBJECT OF THE INVENTION

The object of the invention is to provide a method of making an adhesive tape, more particularly wrapping tape for bundling cables in cars, which can be manufactured less expensively than previous variations, and yet still satisfies the requirements for use thereof in the automotive sector.

SUMMARY OF THE INVENTION

This object is attained by a method making a tape unlike the teaching of DE 60 304 186 T2, that is expressly not a warp-knitted substrate. The fabric may be constructed such that it may be torn by hand in the transverse direction. Typically, the fabric has a thread count of more than 20 threads/cm in the warp direction. A similar number of threads may also be used in the weft direction. In this case, the threads in the warp, or the warp threads, will typically be of a coarser construction than those in the weft direction, the weft threads, to ensure that the fabric can be torn by hand as described in the preceding. In fact, the thread count used in both the warp and the weft direction of the substrate, or of the fabric used therefor, is usually in the order of 30 to 180 denier, preferably about 150 denier for the associated threads (warp threads and weft threads).

This enables particularly good mechanical stability to be achieved while still making it possible for the substrate to be torn in the transverse direction, that is the weft direction. In general, however, it is also possible to work with different yarn counts in the warp and weft directions. For example, it is conceivable for the threads in the warp direction to have a yarn count of 50 to 70 denier. On the other hand, the threads in the weft direction may have a yarn count of about 130 denier.

SPECIFIC DESCRIPTION OF THE INVENTION

The invention typically recommends synthetic fibers, particularly polyester or polypropylene fibers as materials for the filament or fibre yarns of the fabric, or for the warp and weft threads. In general, the fibers may be colored, that is to say they may be spinneret-dyed or yarn dyed. For example, the fibers should be colored black. Moreover, the design is regularly created such that the substrate has a tear strength or tear resistance typically greater than 60 N/cm. Furthermore, an elongation at break of more than 10% is observed as standard. In this way, the substrate and thus also the adhesive tape according to the invention has sufficient mechanical stability to enable it to be used advantageously as wrapping tape for bundling cables in cars. In fact, such wrapping tapes are typically torn by hand in the transverse direction and wound helically around the cables that are to be bundled. In this way, the cables are collected together and also protected from mechanical damage. Moreover, the adhesive tape according to the invention is resistant to various media such as oil, diesel, petrol and the like.

This property is aided in particular by the fact that the inventive hot calendering of the substrate significantly increased the impermeability thereof, that is to say the impermeability of the surface compared with embodiments in which no upstream hot calendering took place. This is also true for the case in which the substrate is only partially hot calendered. Generally, however, the entire surface of the substrate is hot calendered.

At all events, the hot calendering of the fabric as the substrate that is performed according to the invention generally allows the thickness of the substrate to be reduced significantly compared with previous methods. In fact, the substrate that falls within the scope of the present invention typically has a thickness of 0.06 mm to 0.8 mm, generally has a thickness of less than 0.2 mm. Preferably it is usable be even with a thickness of less than 0.1 mm. Particularly preferably, the substrate or fabric substrate has a thickness of just 0.08 mm.

Surprisingly, it has now been found in the context of the invention that substrates, and especially fabric substrates, with such a low thickness of typically less than 0.1 mm are still able to be coated directly without experiencing "adhesive bleeding". This means that as a result of the hot calendering step, substrate or fabric substrate is compressed to such a degree that the subsequently applied adhesive or adhesive coating does not pass through the substrate, or it does not penetrate the substrate when it is applied. In this context, all common coating methods may be used for adhesive application, for example, the hot-melt coating process, blade applicator coating, spraying, rolling, or the like.

Thus, the adhesive tape according to the invention is comparable to otherwise standard fabric substrates, but has a very low grammage. This is particularly important for fitting and using the adhesive tape according to the invention as wrapping tape for bundling cables in cars, since in this case weight reduction is an important development objective. Furthermore, the economical use of materials according to the invention reduces costs. At the same time, when produced with greater thickness (than 0.2 mm for example) the substrate in the form of a hot calendered fabric substrate offers the capability of reducing air permeability significantly. In addition, bleed resistance with regard to the adhesive is increased, and consequently a product is observed that is of superior quality to adhesive tapes having the same thickness.

The hot calendered fabric for the substrate not only has the effect that the substrate is compressed as described, but hot calendering can also help to improve the bending stiffnesses of the substrate surfaces. In fact, hot calendering flattens at least one face of the respective substrate, namely the face thereof that is in contact with the heated roll. This face of the substrate is more or less compressed closed by the described hot calendering process. If this is the top of the substrate and if in this context only the underside thereof is coated with an adhesive, this results in an adhesive tape in which the tape ends do not or cannot protrude, and can be wrapped closely around the cables to be bundled.

Moreover, greater bonding strength is typically observed on the calendered face of the tape, that is to say on the face of the substrate that is more or less impermeably sealed by the hot calendering process. This increased adhesion is particularly manifested, for example, when the adhesive tape according to the invention is wound up to form a roll of tape, or also when the adhesive tape is used as wrapping tape to bundle cables. In fact, in the situations described the adhesive coating on this calendered face of the tape exhibits greater bonding strength than when an adhesive coating is applied to a face of the tape that has not been calendered.

This greater bonding strength can be attributed to the fact that overall the calendered face of the tape is smoother than a face of that tape that has not been calendered, so reduced bonding strength may initially be expected. However, this effect is more than compensated for by the fact that the calendered tape face has a more compressed structure than the non-calendered tape face, so the adhesive in the adhesive coating is unable to penetrate the openings (any more), since they practically no longer exist compared to the situation of a non-calendered tape face.

At all events, the properties of the adhesive tape may also be influenced by treating one or both faces with the heated roll, in the same way as it is by coating one or both faces with the adhesive. If each face of the substrate passes over a heated roll, particularly high flexural strength is imparted to the substrate. On the other hand, if only one face of the substrate is treated with the heated roll, the adhesive tape may be expected to exhibit greater adhesive strength than a face that has not undergone calendering. In this way, the adhesive tape may be adapted in specifically targeted manner to the actual requirements by conducting the appropriate process.

At the same time, use of the previously described synthetic fibers, particularly polypropylene or polyethylene or polyester fibers, ensures that the adhesive tape according to the invention is thermally stable, and particularly that it is easily able to withstand the temperatures up to 100° C. that prevail in the engine compartment when used for bundling cables, for example. Generally, constant temperatures even as high as 150° C. and above may be sustained successfully.

Regarding the individual steps required for hot calendering the substrate, the substrate is generally hot calendered with the aid of an assembly consisting of at least two rolls. In this context, at least one roll is heated so that it can flatten at least one face of the substrate. In most cases, a cold roll (at a temperature equivalent to ambient temperature) and a roll heated to approximately 100° C. to 350° C., and particularly to 150° C. to 250° C. are used together in the calender, forming a nip for the substrate that is to pass between them. The heated roll is typically at a temperature from 150° C. to 250° C. Of course, more than two rolls may always be used.

However, in order to reduce the effort entailed by the device and the method and therewith also the associated manufacturing costs, it is not sufficient simply to use two opposing rolls in the typical manner. Between them, these rolls define the nip, within which typically a pressure of about 2 kp/cm$^2$, corresponding to about 0.2 MPa, is applied to the substrate. In fact, the two rolls are arranged opposite each other in such manner that a pressure of up to 10 MPa is applied at this point. Generally, a pressure in the roll nip from approximately 0.1 to 0.3 MPa is observed. In addition, the invention is regularly performed in such manner that the substrate passes the nip at a speed of about 10 to 400 m/min, particularly about 20 m/min to 50 m/min, and preferably at a speed of about 40 m/min. This enables a fast processing speed. In addition, the indicated processing speed ensures that the substrate is modified by the hot calendering process in a suitable manner for the purpose described in the preceding.

This is further assisted by the fact that the adhesive coating is usually applied in the form of a hot melt adhesive preferably with an acrylate or rubber base. Such a hot-melt adhesive may be applied to the substrate easily at such speeds, immediately after the two rolls of the hot calender. IN this context, the process is usually carried out such that the adhesive coating is applied to all or part of the surface opposite that flattened face of the substrate. In general, however, the adhesive may also be applied not in the described single-step process, but as part of a two-stage procedure regardless of the hot calendering step. In this case, the substrate is first produced as described, and only afterward is the adhesive coating applied, in a second, separate step.

The flattened face of the substrate described in the preceding is observed on the face of the substrate facing the heated roll during hot calendering. Since the roll in the calender that is heated to the indicated values from about 150° C. to 250° C., and preferably about 200° C., the surface thereof ensures that the corresponding face of the substrate is flattened, and that the face of the substrate in contact with the hot roll is improved in terms of its surface properties at this point. In fact, in this context the hot roll ensures that the surface is smoothed, the individual synthetic fibers undergo a heat fixing process with respect to each other, and any residual liquor is evaporated. In this way, at least one face of the substrate is provided with an impermeable or practically impermeable surface that is equivalent to, or surpasses in terms of impermeability, such a surface as is provided by the chintzing according to EP 1 448 744 B1.

In fact, it may be observed here that air permeabilities fall by at least 15 to 25% as a result of hot calendering. This means that a fabric as a substrate without the additional step of hot calendering is 15 to 25% more permeable to air than the same substrate that has undergone hot calendering according to the invention. In particular, for example, air permeabilities of about 70 to 80 $l/m^2s$ are observed for such a substrate made from a fabric, and these may be reduced to values of 60 $l/m^2s$ by additional hot calendering.

The bonding strength with steel is more than 1.5 N/cm. This adhesive strength is measured in accordance with DIN EN 1939 as part of a 180° test. Comparable bonding strengths are observed on the back of the tape in accordance with procedure 2 and based on the previously cited DIN EN 1939 taking into account a 180° test. In addition, reference is made to the October 2009 version of the test standard "Protection systems for cable harnesses in motor vehicles LV 312-1".

As a result, an adhesive tape is provided, which can be produced in a particularly simple and inexpensive manner. The factor primarily responsible for this is the "hot calendering" of the substrate, which unlike the smooth grinding process according to EP 1 448 744 B1 can be performed effectively with less effort and consequently lower expense. In fact, specifically in this context only two more or less identically constructed rolls at different temperatures are needed in the calender, and these may also rotate at the same peripheral speed to transport the substrate through the nip.

Since the adhesive coating is typically applied to the face of the substrate opposite the sealed face, the option exists to wind the adhesive tape, particularly when it is used as wrapping tape, so as to wrap it helically around a set of cables that are to be bundled, so that the impermeable face faces outward in each case. This closed surface of the adhesive tape, or wrapping tape, ensures that any media present in the car or the engine compartment, such as oil, water, petrol, etc., is almost entirely prevented from penetrating the impermeable surface. Thus, such media do not penetrate as far as the adhesive coating facing the cables, and the adhesive tape according to the invention exhibits properties comparable to such that were previously only observed when a coating of paint was applied. These may be considered to represent the major advantages thereof.

I claim:

1. A method of making and using an adhesive tape, the method comprising the steps of:
   providing a fabric substrate having two faces and consisting of transversely extending weft filaments and of warp filaments of a lower thread count than the weft filaments, the warp and weft filaments being so constructed that the tape is manually transversely tearable and has a longitudinal tear resistance greater than 60 N/cm;
   hot calendering the fabric substrate between two rolls;
   heating one of the rolls to a temperature above a temperature of the other of the rolls while rotating the rolls at the same peripheral speed to flatten and seal only one of the faces of the substrate, reduce a thickness of the substrate to between 0.06 mm and 0.08 mm, and reduce air permeability of the substrate by at least 15%;
   applying an adhesive coating to the other of the faces of the substrate; and thereafter
   manually transversely tearing a piece off the hot-calendered and flattened substrate and winding the piece around a cable bundle with the one sealed face of the substrate turned outward away from the cable bundle and the adhesive coating against the cable bundle.

2. The method defined in claim 1, further comprising the step of:
   cooling the other of the rolls, the one roll being heated to between 100° C. and 350° C.

3. The method defined in claim 1, wherein the rolls pinch the substrate with a pressure of up to 10 Mpa.

4. The method defined in claim 1, further comprising the step of:
   passing the substrate through a nip formed between the rolls at a speed of 10 m/min to 400 m/min.

5. The method defined in claim 1, wherein the one roll is heated to 100° C. to 350° C. and both rolls form a nip through which the substrate passes.

6. The method defined in claim 5, further comprising the step of:
   applying with the rolls to the substrate in the nip a pressure of up to 10 MPa.

7. The method defined in claim 6, further comprising the step of:
   passing the substrate through the nip at a speed of 10 m/min to 400 m/min.

8. The method defined in claim 1, wherein the adhesive coating is applied to a part or all of the other face of the substrate.

9. The method defined in claim 1, further comprising the step of:
   using a hot melt adhesive based on acrylate or rubber as the adhesive coating.

10. The method defined in claim 1, wherein the one roll is heated and sealed so as to render impermeable the one face of the substrate.

11. The method defined in claim 1, wherein the adhesive is only applied to the other of the faces.

12. The method defined in claim 1 wherein the one sealed face of the fabric substrate is turned away from the cable bundle.

* * * * *